Oct. 8, 1929.  E. C. FRITTS  1,730,930
DUPLEX CAMERA
Filed Feb. 17, 1928   2 Sheets-Sheet 1
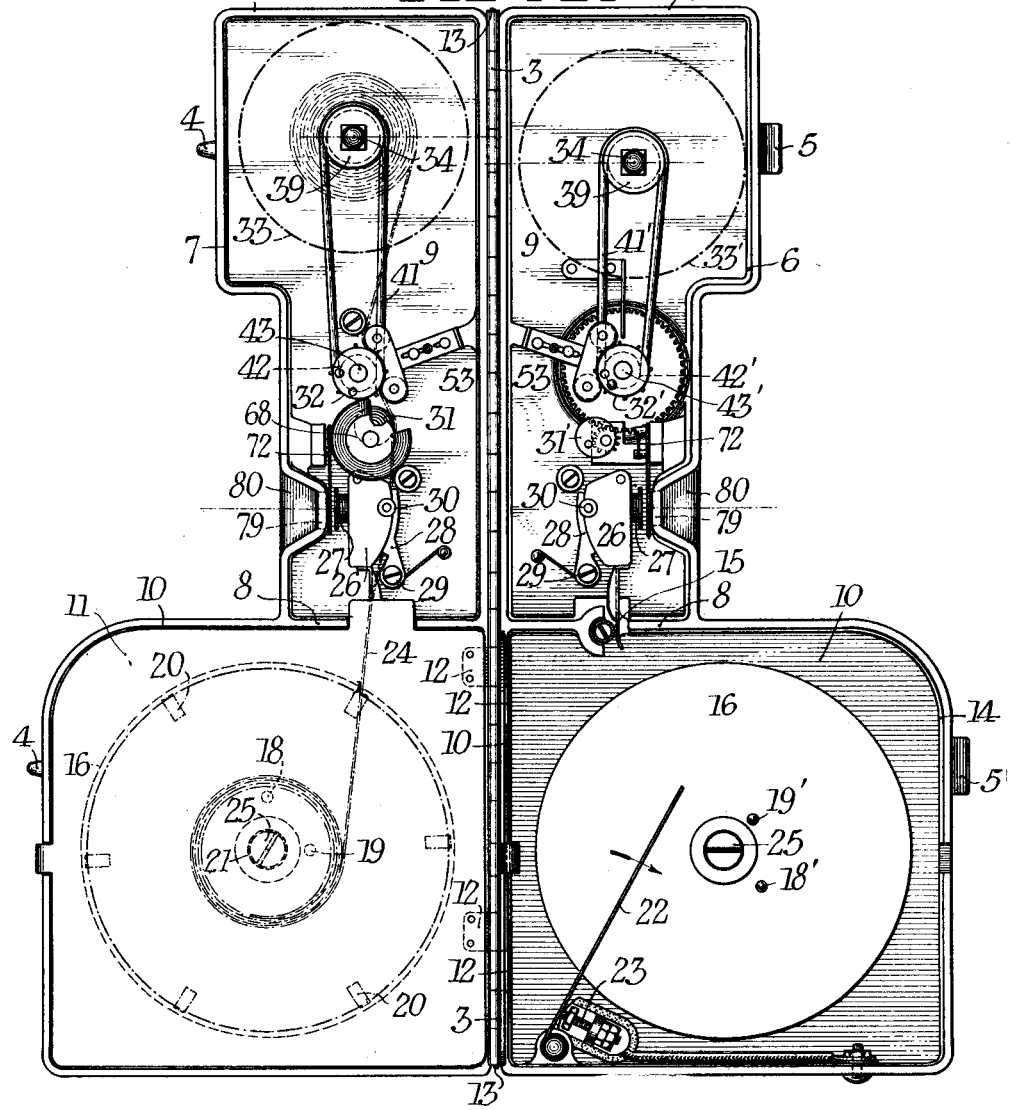
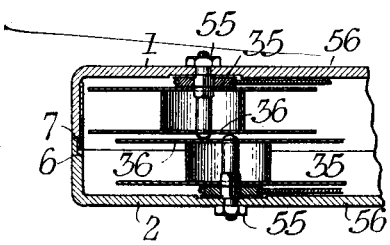
Inventor,
Edwin C. Fritts,
R. L. Stinchfield
N. M. Perris
By
Attorneys Oct. 8, 1929.  E. C. FRITTS  1,730,930
DUPLEX CAMERA
Filed Feb. 17, 1928  2 Sheets-Sheet 2
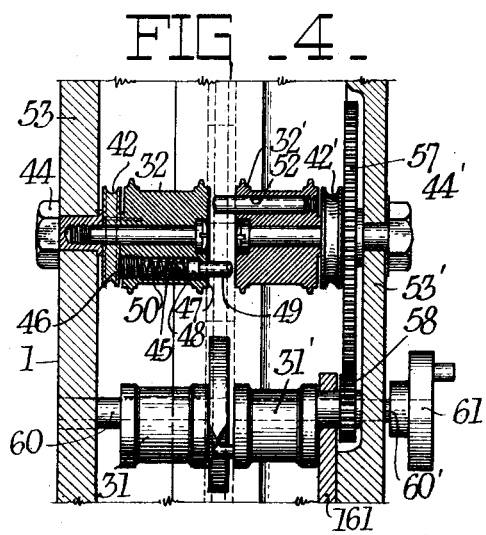
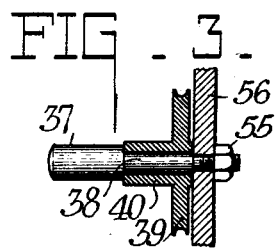
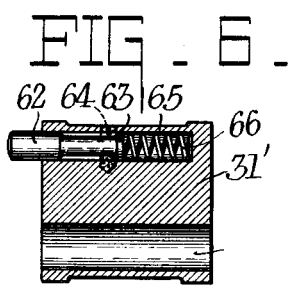
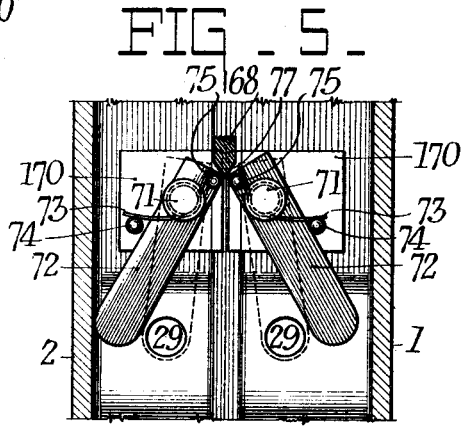
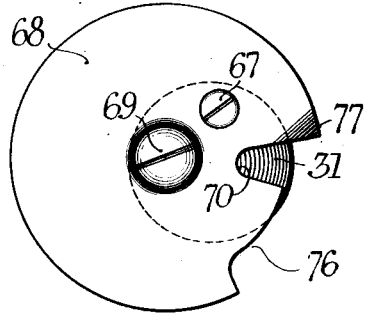
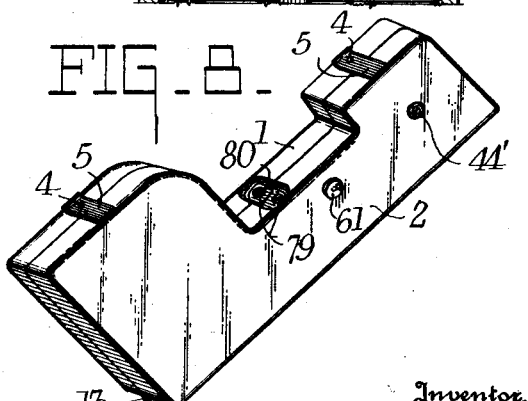
Inventor,
Edwin C. Fritts,
R. L. Stinchfield
By N. M. Perrins
Attorney Patented Oct. 8, 1929

1,730,930

UNITED STATES PATENT OFFICE

EDWIN C. FRITTS, OF ROCHESTER, NEW YORK, ASSIGNOR TO EASTMAN KODAK COMPANY, OF ROCHESTER, NEW YORK, A CORPORATION OF NEW YORK

DUPLEX CAMERA

Application filed February 17, 1928. Serial No. 255,102.

This invention relates to photographic apparatus and more particularly to a camera adapted for automatically making a series of exposures upon two separate films. While the camera herein described is susceptible of use for motion picture purposes it is particularly designed for use in a copying apparatus for making records of documents, checks or the like, of the type disclosed in the copending application of Roy S. Hopkins, Serial No. 237,467, filed December 3, 1927.

The records made by such a machine are frequently required at once for more than one purpose and it is simpler to make two original records than to make an original record and a print therefrom. An object of the present invention is to make a duplex camera for this purpose which is simple to load, the parts being readily accessible, and in which two films are simultaneously moved and exposed.

Further objects are to provide a daylight loading camera consisting of two symmetrical casings containing separate cameras having definite cooperating relationships between the several parts thereof; to provide a structure wherein the same spool may be used in either casing and will necessarily be correctly positioned; to provide take-up shafts each of which will retain a reel on the other shaft; to provide for the transmission of power from one camera to the other and to insure the synchronous operation.

Other objects and advantages will appear from the following description wherein reference is made to the accompanying drawings, in the several figures of which the same reference characters refer to the same parts throughout and in which:

Fig. 1 is a front view of the camera in open position;

Fig. 2 is a vertical section through the top part of the camera in closed position;

Fig. 3 is a section through a take-up reel shaft;

Fig. 4 is a fragmentary vertical section of the camera in closed position;

Fig. 5 is a fragmentary section showing the shutter structure;

Fig. 6 is a section through one of the beater rolls;

Fig. 7 is an end elevation of the other roll and a combined cam and clutch member carried thereby;

Fig. 8 is a perspective view of the camera closed.

The camera embodying my inventions as herein disclosed comprises two symmetrical casings 1 and 2 which are hinged together at 3 along their meeting edges. These casings may be swung together and held in closed position by cooperating latch members 4 and 5. They are open upon their facing sides and together constitute a light-tight camera case or box. Since the parts in the two casings are largely the same, the same reference characters will be used for each except when they are specifically necessary to distinguish them. Each of the casings is separated by a partition 8 into two compartments 9 and 10, the former containing the mechanism of the camera and the latter constituting a magazine for the supply reel of film. Casing 2 is rabbeted at 6 around the edges to the upper compartment 9 and casing 1 has a corresponding flange 7 seating in said rabbet. A cover 11 is provided for each magazine 10, and is shown closed on the casing 1 and open on casing 2. The covers are hinged at 12 upon the rod 13 of the main piano hinge 3. These covers seat when closed in rabbets 14. A light baffled opening 15 is provided in the partition 8 for the passage of film. In each magazine 10 is rotatably mounted a reel support 16 carrying an axial shaft 25 and two positioning pins 18 and 19 or 18' and 19' at different radial distances from the axis. It is to be noted that the pins of the two supports are symmetrically, instead of similarly, arranged with respect to each other. That is, the two pins are separated by the same angular distance, and have the same radial distances from the axis in each casing, but the direction of the angle from the longer radius to the shorter is reversed. I intend for use with these supports a reel of the type disclosed in my copending application, Serial No. 249,935, filed January 27, 1928, having flexible flanges connected by fragile edge strips 20. Such a reel is indicated in dotted lines in the left hand casing Fig. 1. This reel will be made with perforations extending through its core 21 and corresponding in position to the pins 18 and 19 and 18' and 19'. It is obvious that the reels must, when the casings are closed, be so positioned that the film will be unwound in the same direction in each casing; but when the casings are open the reel must be inserted from the left of one casing and from the right of the other. With reel and pin structure just described, the reel can be inserted only in the correct position in each casing.

In each casing is hinged an arm 22 spring pressed toward the shaft 25 and at a definite position touching a contact 23 and closing an electric circuit to operate an alarm (not shown).

In operation the reel is positioned in the magazine with a free end of film protruding through the opening 15. The cover 11 is closed and the film 24 is then drawn through the opening and threaded in the camera.

The pull on the film breaks the fragile cross strips 20 as disclosed in my copending application.

Above the opening 15 is a gate comprising a fixed member 26 carrying the lens mount 27 rigidly therewith. As this camera is intended primarily for use in a special machine, no provision is necessary for focussing after the original factory adjustment. A second gate member 28 is hinged at 29 and spring pressed against member 26, a latch 30 holding it secured in position. In alignment with the lens and gate is an opening 79 in a depression 80 of the casing wall.

The film passes upwardly from the gate being intermittently advanced by a beater 31 or 31' and continuously advanced by a sprocket 32 or 32' to a take-up reel 33 indicated in dotted lines and carried on a shaft 34. The take-up reel is of a known type having a square hole in one side 35 and a round hole in alignment therewith in the other side 36. The take-up shaft consists of a bolt secured by a nut 55 to the casing wall 56 and having a round end portion 37 and a reduced intermediate portion 38 on which is loosely mounted a pulley 39 with the square shaft 40 integral therewith. This pulley is driven by a belt 41 from a pulley 42 or 42' rigidly connected to a sprocket 32 or 32' and rotatable on the bolt or shaft 43 or 43' supported by the bushing 44 or 44' in the casing wall 53 or 53'.

One of the sprockets carries a fixed pin and the other a spring pressed pin which are adapted to engage and constitute a clutch to transmit motion. As shown, an aperture 45 extends through sprocket 32 and is screw threaded at one end whereby a plug 46 may be screwed in and at the other end has an annular shoulder 47 against which a shoulder 48 on the extending pin 49 is held by the spring 50.

Sprocket 32' has an aperture 51 with a screw thread by which pin 52 is fixedly secured in place. When the casings are closed, if the pins come into alignment, pin 49 will be pushed back, but when pin 52 is moved it will slip from aligning position. One pin then constitutes an abutment against which the other engages. Rigid with sprocket 32' and pulley 42' is a gear 57 driven from gear 58 on shaft 60' extending through wall 53' and carrying a clutch member 61 which may be driven by a suitable cooperating part of the machine with which the camera is intended for use. Shaft 60' passes through the supporting plate 161 and carries the beater 31' in the form of a round roller eccentrically and rigidly mounted on the shaft. In this roller is an aperture 65 containing the pin 62 having a shoulder 63 pressed against cross screw 64, which is let in from the exterior of the roller, by a spring 66.

A shaft 60 is rigidly mounted in casing 1 in alignment with shaft 60' and carries loosely and eccentrically thereof the beater roller 31 to which is secured by screw 67 a cam and clutch disc 68. Headed screw 69 maintains the disc and beater on the shaft 60. Disc 68 has a recess 70 into which pin 62 fits when the casings 1 and 2 are closed together; the pin and the wall of the recess acting as an abutment, constitute a clutch transmitting power from one beater to the other. If, when the casings are closed the pin 62 does not fall into the recess it will be pushed back by the abutment member or disc 68 upon the outer surface of which it will ride until it reaches the recess.

In each casing 1 and 2 is a block 170 carrying a stud 71 on which is pivoted a shutter blade 72 normally impelled to a position shown in Fig. 5, out of alignment with hole 29, by spring 73 which engages a fixed lug 74 on block 170, is coiled around stud 71 and engages a lug 75 on the shutter blade 72. The two shutter blades contact each other at the limit of their movements. When in this position the lugs 75 are in the path of movement of the outer part of the disc 68. The periphery of this disc is continuous except for an arc of about 60° in the embodiment here shown, there being an arcuate slot 76 which is extended inwardly at one end to form the recess 70 above described. When the lugs 75 are opposite this slot 76 the parts are in the position shown in Fig. 5, but as this disc rotates in a clockwise direction (Fig. 7) the end 77 of the slot, which is wedge shaped, enters between the lugs 75 and forces them apart moving the shutter blades to the position shown in Fig. 5 in dotted lines in alignment with opening 29.

The beaters are of the same dimensions and bear the same relation to their respective shafts, and their relation to their respective clutch elements is such that they act synchronously and identically on the films in the two casings during the period that the shutters are in alignment with the exposure gate. It is to be noted that the exposure period is short relative to the pulldown period.

It is to be understood that the above disclosure is by way of example and that I contemplate as included within my invention all such modifications and equivalents as fall within the scope of the appended claims.

Having thus described my invention, what I claim as new and desire to secure by Letters Patent is:

1. A structure of the class described comprising two complementary casings hinged to one another and adapted to be folded together, the casings being open on their facing sides, each of said casings containing an exposure gate, means for moving film past said gate and means for supporting supply and take-up reels of film.

2. A structure of the class described comprising two complementary casings, each having an open side, cooperating members on the two casings whereby they may be secured together with their open sides facing to constitute a close, light tight camera box, each casing having an exposure gate, an opening opposite said gate and mechanism, said mechanism including a shutter to control the passage of light through said opening to said gate, means for advancing film past said exposure gate and a takeup shaft for said film, a driving connection for the mechanism of one casing operable from without the camera box, and cooperating parts on the two mechanisms in operative relation when the casings are secured together to transmit motion from one mechanism to the other.

3. A structure of the class described comprising two complementary casings adapted to be secured together, film advancing mechanism in each casing including shafts in alignment when the casings are secured together, co-operating clutch members on the shafts whereby one shaft may drive the other and the two mechanisms operate synchronously, the clutch members comprising an abutment member carried by one shaft and a protruding pin carried by the other shaft eccentric of the axis, and adapted to engage the side of the abutment member, said pin being spring pressed outwardly whereby it may be pushed backwardly if it engages the top of the abutment member when the casings are secured together and being capable of slipping on the top of said member.

4. A structure of the class described comprising two complementary casings adapted to be secured together, a device in each casing for intermittently advancing film therethrough, said device comprising a shaft and a beater carried by the shaft, said devices carrying cooperating clutch elements, one of said clutch elements being an abutment member and the other being a pin to engage the side of the abutment member, said pin being spring pressed outwardly whereby it may be pushed backwardly if it engages the top of the abutment member when the casings are secured together and being capable of slipping on the top of said member.

5. A structure of the class described comprising two complementary casings adapted to be secured together, a device in each casing for intermittently advancing film therethrough, said device comprising a shaft and a beater carried by the shaft, said devices carrying cooperating clutch elements, one of said clutch elements being an abutment member and the other being a pin to engage the side of the abutment member, said pin being spring pressed outwardly, whereby it may be pushed backwardly if it engages the top of the abutment member when the casings are secured together and being capable of slipping on the top of said member, the relative positions of the beaters being the same when the clutch members are in driving engagements, whereby films will be simultaneously intermittently advanced in both casings.

6. A structure of the class described comprising two complementary casings adapted to be secured together, a device in each casing for intermittently advancing film therethrough, said device comprising a shaft and a roller eccentrically carried thereby and adapted to act as a beater to intermittently advance a strip of film, the shafts being in alignment when the casings are secured together, a disc carried by one device and having a recess, a pin carried by the other device and adapted when the casings are secured together to engage the recess and constitute therewith a driving clutch, the pin being spring pressed outwardly whereby it may be pushed backwardly if it engages the surface of the disc when the casings are secured together and being capable of slipping on the surface of the disc until it seats in the recess.

7. A structure of the class described comprising two complementary casings adapted to be secured together, each casing having an exposure gate and a shutter in alignment with said gate, each shutter having an operating means, a shutter operating member carried by one casing and having a path of movement intersecting both operating means, whereby said member operates both shutters in timed relation.

8. A structure of the class described comprising two complementary casings adapted to be secured together, each casing having an exposure gate and a shutter mounted to oscillate between two positions, one of which is in alignment with said gate, and normally spring pressed to one of said positions, and a single operating member carried by one of said casings and having a path of movement intersecting parts of both of said shutters, whereby said member may engage and move in timed relation both of said shutters away from their normal positions to uncover said gates.

9. A structure of the class described comprising two separable complementary casings with cooperating connections whereby they may be connected together, each having an exposure gate and mechanism, said mechanism including shafts, one in each casing, the shafts having at their outer ends cooperating clutch elements whereby one shaft may drive the other, a shutter carried by each casing controlling the passage of light to the corresponding exposure gate, one of said shafts carrying a common operating means for both shutters, and a film advancing means in each casing, the two film advancing means having the same operative relation to the corresponding shafts and means for driving one of said shafts whereby the two film-advancing means and shutters will be operated synchronously.

10. A structure of the class described comprising two complementary casings adapted to be secured together, an exposure gate in each casing and a device in each casing for intermittently advancing film past said gate, said device comprising a shaft and a beater member rigidly carried thereby, the shafts being in alignment when the casings are secured together, a disc carried by one device and having a recess, a pin carried by the other device and adapted when the casings are secured together to engage the recess and constitute therewith a driving clutch, a movable shutter in each casing and having an operating part, the two operating parts extending into close proximity, the disc having a cam part with a path of movement intersecting both operating parts whereby upon rotation of the disc the cam part will simultaneously engage both said operating parts and move the shutters simultaneously.

11. A structure of the class described comprising two complementary casings adapted to be secured together, an exposure gate in each casing and a device in each casing for intermittently advancing film past said gate, said device comprising a shaft and a beater member carried thereby, the shafts being in alignment when the casings are secured together, a disc carried by one device and having a recess, a pin carried by the other device and adapted when the casings are secured together to engage the recess and constitute therewith a driving clutch, a movable shutter in each casing and having an operating part, the two operating parts extending into close proximity, the disc having a cam part with a path of movement intersecting both operating parts whereby upon rotation of the disc the cam part will simultaneously engage both said operating parts and move the shutters simultaneously, the relative positions of the beaters being the same when the pin and recess are in engagement whereby films will be simultaneously and intermittently advanced in both casings.

12. A structure of the class described comprising two complementary casings adapted to be secured together, an exposure gate in each casing, and a device in each casing for intermittently advancing film past said gate, said device comprising a shaft and a beater member carried thereby, a disc carried by one device and having a recess, a pin carried by the other device and adapted when the casings are secured together to engage the recess and constitute therewith a driving clutch, a movable shutter in each casing to control the passage of light to the gate and having an operating part, the disc having a cam part with a path of movement intersecting both operating parts whereby upon rotation of the disc said cam part will engage both said operating parts and move both shutters.

13. A structure of the class described comprising two complementary casings adapted to be secured together, an exposure gate in each casing and a device in each casing for intermittently advancing film past said gate, said device comprising a shaft and a beater member carried thereby, a disc carried by one device and having a recess, a pin carried by the other device and adapted when the casings are secured together to engage the recess and constitute therewith a driving clutch, a movable shutter in each casing to control the passage of light to the gate and having an operating part, the disc having a cam part with a path of movement intersecting both operating parts whereby upon rotation of the disc said cam part will engage both said operating parts and move both shutters, the relative positions of the beaters being the same when the pin and recess are in engagement, whereby film will be simultaneously and intermittently advanced in both casings.

14. A structure of the class described comprising two casings with cooperating connections whereby they may be secured together, each having an exposure gate and mechanism, each mechanism including a film advancing sprocket and a film advancing means operative to advance film intermittently past said gate, the mechanism in one casing including a driving connection between the sprocket and the advancing means, the corresponding parts of the two mechanisms being symmetrically arranged whereby the sprockets and advancing means are in alignment when the casings are secured together, and cooperating clutch elements on the said sprockets and on the advancing means.

15. A structure of the class described comprising two casings with cooperating connections whereby they may be secured together, each having an exposure gate and mechanism, each mechanism including a film advancing sprocket and a film advancing means operated to advance film intermittently past said gate, the mechanism in one casing including a driving connection between the sprocket and the advancing means, the corresponding parts of the two mechanisms being symmetrically arranged whereby the sprockets and advancing means are in alignment when the casings are secured together, and cooperating clutch elements on the said sprockets and on the advancing means, the clutch elements in each case comprising an abutment member and a spring pressed pin to engage the side of the abutment member, whereby the pin will be pushed backwardly if it engages the top of the abutment member when the casings are secured together.

16. A structure of the class described comprising two casings with cooperating connections whereby they may be secured together, each having an exposure gate and mechanism, each mechanism including a film advancing sprocket, an intermittently operative film-advancing means and a shutter in alignment with the gate, the mechanism in one casing including a driving connection between the film advancing sprocket and the film advancing means, the corresponding parts of the two mechanisms being symmetrically arranged whereby the sprockets and film advancing means are in alignment when the casings are connected, and cooperating clutch elements on each of the sprockets and each of the film advancing means whereby motion is communicated from the said parts of one mechanism to the corresponding parts of the other mechanism, and one of said mechanisms carrying a common operating means for both shutters.

17. A duplex camera comprising two symmetrically arranged compartments, symmetrically arranged camera mechanisms in said compartments including means for feeding film through the cameras and supports for supply reels of film, said supports having axially unsymmetrical reel positioning means, symmetrically arranged with respect to each other.

18. In combination, a duplex camera comprising two symmetrically arranged compartments, symmetrically arranged camera mechanisms in the two compartments including means for feeding film through the cameras and supports for reels of films, the supports having axially unsymmetrical reel positioning studs symmetrically arranged with respect to each other and a reel having positioning apertures extending therethrough and conforming in position to the studs, whereby the reel may be positioned on one support only from one side and on the other support only from the other side.

19. A structure of the class described comprising two complementary casings, each having an open side, cooperating members on the two casings whereby they may be secured together in a definite position with their open sides facing, a shaft for supporting a reel mounted in each casing, the shafts being parallel and out of alignment when the casings are secured together and the ends of the shafts extending past one another, whereby the end of each shaft is operative to prevent the removal of a reel from the other craft.

Signed at Rochester, New York, this 14th day of February, 1928.

EDWIN C. FRITTS.